3,842,056
METHOD FOR PRODUCING POLYVINYL CHLORIDE

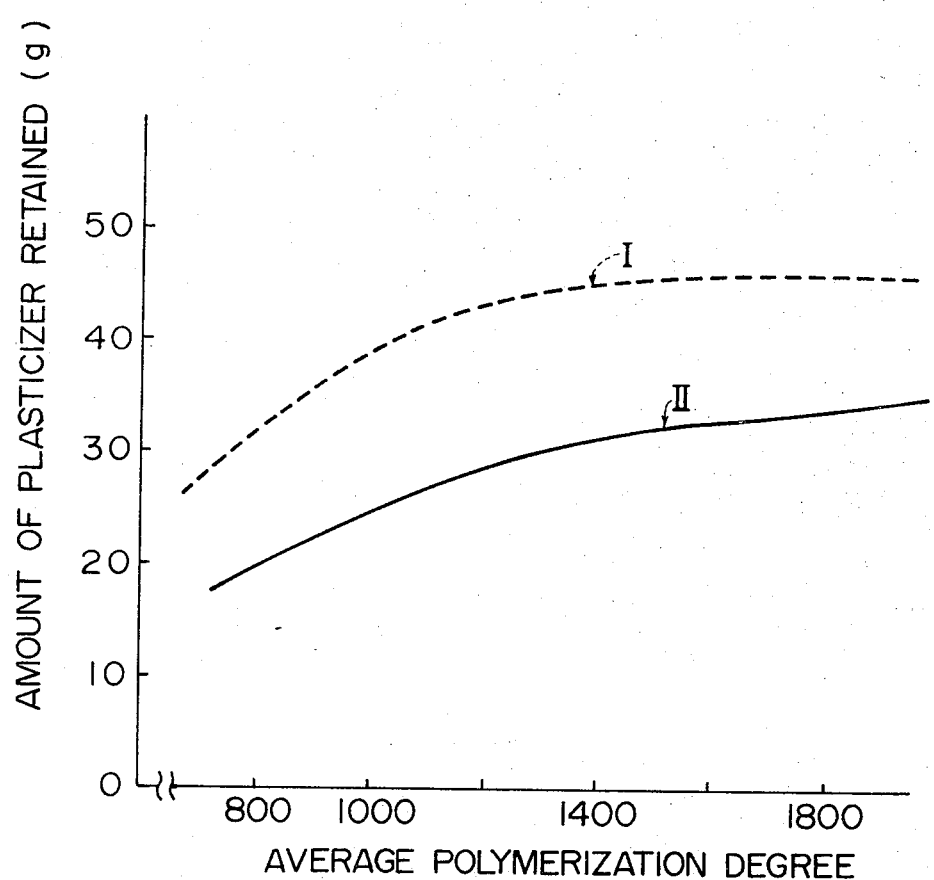

Masataka Torigoe, Masami Wada, and Kazuaki Nakano, Minamata, and Shiro Aruga, Tokyo, Japan, assignors to Chisso Corporation, Osaka, Japan
Filed July 27, 1971, Ser. No. 166,415
Claims priority, application Japan, July 31, 1970, 45/67,095
Int. Cl. C08f 1/09
U.S. Cl. 260—92.8 W                    2 Claims

ABSTRACT OF THE DISCLOSURE

Vinyl chloride is suspension-polymerized by simultaneously using as suspension stabilizer, specified amounts of a polyethylene oxide and a nonionic surfactant.

The resulting polyvinyl chloride has an improved, superior, particle size distribution, transparency, gelation and absorptivity of plasticizer, as compared with polyvinyl chloride obtained by using a conventional, well-known suspension stabilizer.

DESCRIPTION OF THE INVENTION

This invention relates to a method for suspension-polymerizing vinyl chloride in an aqueous dispersion medium by the use of specified suspension stabilizers.

Heretofore, in suspension-polymerizing vinyl chloride, a method has been usually employed in which a monomer is dispersed in an aqueous dispersion medium with stirring by the use of partially hydrolyzed polyvinyl alcohol, a natural substance such as gelatin, or a surfactant, as a suspension stabilizer, and then polymerized on heating. The polymers obtained according to this method have been widely used in terms of general-purpose polyvinyl chloride resins, for producing raw materials for shaped articles or others.

However, the polymers obtained by using these suspension stabilizers have such drawbacks that they are generally so slow in absorption velocity of plasticizers and in gelation velocity that the working efficiency at the time of processing is inferior, and also their ability for retaining plasticizers is so small when a large amount of plasticizers is to be used, that the dry-up (i.e. a period of time up to a complete absorption of plasticizer) is slow and hence handling is difficult in processing.

Further, the sheets or films which are shaped from such polymers obtained by the use of conventional suspension stabilizers, are generally inferior in transparency, and cannot be applied to a field where a higher grade of transparency is desired.

Furthermore, when film shaping is carried out according to a solution-casting method, it is difficult to obtain a transparent film because a suspension stabilizer insoluble in solvent remains in the film.

Still further, in case where the polymers are applied to a field of melt-spinning or the like, there is such a drawback that the stabilizers are liable to clog in the spinning screen.

An object of the present invention is to provide a polyvinyl chloride having an extremely superior quality and having no drawback as mentioned above.

The present inventors have found that the above-mentioned object can be attained by simultaneously using as suspension stabilizers, a polyethylene oxide and a nonionic surfactant, each in specified amounts, in the suspension-polymerization of vinyl chloride, and have completed the present invention.

That is to say, the present invention consists in a method for producing a polyvinyl chloride by suspension-polymerizing vinyl chloride monomer in an aqueous medium, which is characterized by simultaneously using as suspension stabilizers, 0.01–2.0% by weight of a polyethylene oxide and 0.01–2.0% by weight of a nonionic surfactant, based on the weight of the vinyl chloride monomer.

The polyethylene oxide to be used as a component of the suspension stabilizers is preferably the one having a mean molecular weight of about $4 \times 10^4$–$1.2 \times 10^6$. Its amount to be added is preferably 0.01–2% by weight based upon the weight of the vinyl chloride monomer, more preferably 0.1–1.5% by weight. If the amount of polyethylene oxide to be added exceeds 2.0% by weight, the mixture of aqueous medium and suspension stabilizer becomes difficult to handle. If the amount is less than 0.01% by weight, the suspension stabilization effect is not attained. Thus, with the range of the amount to be added, other than the above-mentioned, the object of the present invention cannot be attained.

As the nonionic surfactant to be simultaneously used with the polyethylene oxide in the present invention, one or more kinds selected from the following compounds are preferable: polyoxyethylene higher fatty acid esters such as polyoxyethylene laurate, polyoxyethylene higher saturated aliphatic alcohol condensates such as polyoxyethylene stearyl ether, polyoxyethylene alkylphenol condensates, polyoxyethylene sorbitan higher fatty acid esters, sorbitan higher fatty acid esters, higher fatty acid pentaerythritol esters, higher fatty acid glycerol esters, polyoxyethylene polyol higher fatty acid ester condensates, polyoxyethylene-polyoxypropylene copolymers, etc. Among these, sorbitan higher fatty acid esters and/or polyoxyethylene sorbitan higher fatty acid esters are particularly preferable.

The amount of the above-mentioned nonionic surfactants to be added is preferably within the range of 0.01–2.0% by weight based upon the weight of vinyl chloride monomer, more preferably 0.05–1.0% by weight.

It is indispensable for the present invention to use the above-mentioned two components as suspension stabilizers, but, if necessary, well-known suspension stabilizers other than the above-mentioned two components can be further added.

The suspension polymerization of vinyl chloride monomers according to the method of the present invention can be carried out similarly to conventional methods except that a polyethylene oxide and a nonionic surfactant as suspension stabilizers are used as indispensable components. Namely, the polymerization is carried out by employing as the catalyst, a conventional, well-known polymerization initiator such as benzoyl peroxide, lauroyl peroxide, $\alpha,\alpha'$-azobisisobutyronitrile, $\alpha,\alpha'$-azobis-2,4-dimethylvaleronitrile, isopropylperoxydicarbonate, acetylcyclohexylsulfonyl peroxide, etc., and introducing the catalyst together with the above-mentioned suspension stabilizers and then vinyl chloride monomer into an aqueous medium with stirring to disperse the monomer, followed by heating the resulting dispersion at a temperature of about 30–70° C.

In order to control the mean molecular weight of vinyl chloride polymer, an organic solvent such as alcohols, aliphatic or aromatic hydrocarbons or the like can be added to the polymerization system, and further, various additives can be used.

Next, the present invention will be illustrated by the following Examples. In these Examples, the processability and physical properties of the resultant polymers were observed according to the following measurement methods:

(a) Take-up of plasticizer 10 g. of the resin is dipped for 30 minutes in dioctyl phthalate maintained at 30° C. Thereafter, an excess amount of dioctyl phthalate is removed by centrifuge, and the weight of the sample is measured. The take-up is shown by the increase in weight.

(b) Dry-up time of plasticizer 50 g. of the resin and 25 g. of dioctyl phthalate are fed into a vessel maintained at 80° C. and stirred.

The dry-up time is shown by the period of time required for a complete absorption of dioctyl phthalate.

(c) Gelation time

To 100 g. of the resin are added 50 g. of dioctyl phthalate, 5.0 g. of tribasic lead sulfate and 1.0 g. of lead stearate, followed by mixing. The resulting mixture is kneaded by rolls at 140° C. The gelation time is shown by the time required to give a homogeneously gelled film.

(d) Transparency

To 100 g. of the resin are added 50 g. of dioctyl phthalate, 1.5 g. of barium stearate and 1.5 g. of cadmium stearate, followed by mixing. The resulting mixture is kneaded by rolls at 150° C. and then shaped by pressing into a sheet having a thickness of 5 m./m. The transparency of the sheet thus obtained is judged by observing with naked eyes, and designated by symbols, $a$, $a'$, $b$, $b'$, $c$ and $c'$, the transparency being reduced in this order.

(e) Solubility 1 g. of the resin is introduced into a test tube and 5 g. of a solvent mixture of acetone and benzene (ratio by weight, 1:1) is added, followed by heating in an oil bath maintained at 130° C. After cooling, the resultant is taken out. Its color Standard Number is determined according to ASTM D 1209–621.

Further, the suspension stabilizers used are shown in the following Table 1 in which they are designated by symbols A–I, for convenience.

C. with stirring to polymerize the monomer. The resulting polymerization liquid was filtered followed by washing with water and drying. Particle size distribution, plasticizer take-up, dry-up time of plasticizer, gelation time, transparency and solubility of the polymer thus obtained, were observed. The results are shown in Table 2.

TABLE 2

| Number of control or example | Control | | | Example |
|---|---|---|---|---|
| | 1 | 2 | 3 | 1 |
| Suspension stabilizer (based on vinyl chloride, by weight) percent | A | B | C | B + C |
| | 0.1 | 0.6 | 1.0 | 0.1  0.5 |
| Particle size (mesh pass) (percentage): | | | | |
| 60 mesh | 99.7 | 43.6 | 51.2 | 100 |
| 80 mesh | 63.9 | 19.2 | 34.3 | 98.8 |
| 100 mesh | 37.0 | 12.2 | 21.5 | 86.0 |
| 150 mesh | 8.6 | 3.8 | 7.6 | 31.0 |
| 200 mesh | 2.7 | 0.4 | 2.9 | 3.1 |
| Plasticizer take-up (g.) | 23 | 27 | 26 | 45 |
| Dry-up time of plasticizer (min.) | 17.5 | 14.8 | 13.8 | 8.3 |
| Gelation time (min.) | 2.5 | 2.0 | 1.8 | 0.75 |
| Transparency | c | b | b' | a |
| Solubility | 40 | 10 | 10 | 10 |

As apparent from Table 2, in Controls 2 and 3 wherein either a polyethylene oxide or a polyoxyethylene sorbitan higher fatty acid ester was solely used, the particle size distribution became so broad as compared with Control 1 wherein polyvinyl alcohol, a conventional, well-known suspension stabilizer, was used, that no polymer capable of being practically handled was obtained. In addition, the gelation property and the absorptivity of plasticizer were scarcely improved. However, in Example 1 wherein the two suspension stabilizers (polyethylene oxide and polyoxyethylene sorbitan higher fatty acid ester) were simultaneously used, a polymer having a better, particle size distribution could be obtained. Further, it was suitable for practical use and also had notably improved transparency, gelation property, absorptivity of plasticizer, etc.

Examples 2–4 and Controls 4 and 5

Vinyl chloride was polymerized by the use of suspension stabilizers A–E in the same procedure as in Example 1, and polymers having properties as shown in Table 3 were obtained.

TABLE 3

| Number of control or example | Control | | Example | | |
|---|---|---|---|---|---|
| | 4 | 5 | 2 | 2 | 4 |
| Suspension stabilizer (based on vinyl chloride, by weight) percent | A | D | D + E | B + C | D + C |
| | 0.1 | 0.6 | 0.2  1.0 | 0.5  1.0 | 0.2  0.5 |
| Particle size (mesh pass) (percentage): | | | | | |
| 60 mesh | 99.3 | 52.6 | 100 | 100 | 100 |
| 80 mesh | 58.6 | 27.2 | 97.1 | 99.6 | 96.1 |
| 100 mesh | 32.1 | 15.0 | 75.1 | 89.3 | 72.6 |
| 150 mesh | 7.8 | 4.1 | 28.7 | 38.3 | 29.1 |
| 200 mesh | 3.1 | 0.5 | 2.9 | 4.1 | 3.0 |
| Plasticizer take-up (g.) | 23 | 27 | 41 | 45 | 43 |
| Dry-up time of plasticizer (min.) | 18.6 | 15.0 | 10.1 | 8.3 | 9.6 |
| Gelation time (min.) | 2.3 | 2.1 | 1.2 | 0.8 | 1.1 |
| Transparency | c | b | a | a' | a |
| Solubility | 40 | 10 | 10 | 10 | 5 |

TABLE 1

| Symbol of suspension stabilizer | Kind and properties of suspension stabilizer |
|---|---|
| A | Polyvinyl aclohol, saponification degree: 81.5%, polymerization degree: 2,130. |
| B | Polyethylene oxide, mean molecular weight: 100,000,000. |
| C | Polyoxyethylene sorbitan monolaurate. |
| D | Polyethylene oxide, mean molecular weight: 60,000,000. |
| E | Polyoxyethylene sorbitan monostearate. |
| F | Sorbitan monolaurate. |
| G | Sorbitan monostearate. |
| H | Glycerol monostearate. |
| I | Polyoxyethylene-polyoxypropylene copolymer, polyoxyethylene content: 20%, polyoxypropylene mean molecular weight: 2,000. |

Example 1 and Controls 1–3

Into an autoclave of stainless steel having a capacity of 200 l. were fed 200 parts by weight of water, an amount of a suspension stabilizer as shown in the following Table 2, and 0.1 part by weight of lauroyl peroxide as catalyst. After replacing of the air within the vessel by nitrogen, 100 parts by weight of vinyl chloride monomer were fed. The inner temperature was elevated to 58°

As apparent from Table 3, polymers (in Examples 2–4) obtained by simultaneously using a polyethylene oxide and a polyoxyethylene sorbitan higher fatty acid ester, were larger in the absorption velocity and retained amount of plasticizer and also faster in gelation, as compared with polymers (in Controls 4 and 5) obtained by using conventional, well-known suspension stabilizers. Accordingly, the working efficiency at the time of processing was improved; handling was easy; insoluble part in solvent was few; and the transparency of shaped sheet was superior. Thus, it is apparent that the polymers obtained according to the method of the present invention, are suitable for application fields where transparency is required, where solvent-treatment is carried out, where they are used for melt-spinning, and the like.

Examples 5–8 and Controls 6–9

Vinyl chloride was polymerized by the use of suspension stabilizers, A, B, D, F, G, H and I, in the same procedure as in Example 1, and polymers as shown in Table 4 were obtained.

aqueous dispersion medium utilizing a suspension stabilizer, an initiator, and conventional temperatures, pres-

TABLE 4

| Number of control or example | Control | | | | | Example | | | | | |
|---|---|---|---|---|---|---|---|---|---|---|---|
| | 4 | 6 | 7 | 8 | 9 | 5 | 6 | 7 | 8 | 9 | 10 |
| Suspension stabilizer (based on vinyl chloride, by weight) percent | A 0.1 | B 1.5 | D 1.2 | F 1.5 | G 1.0 | B+F 0.5 1.0 | B+G 0.5 0.5 | D+F 0.2 0.5 | D+G 0.2 1.5 | B+H 0.5 1.0 | B+I 0.2 0.5 |
| Particle size (mesh pass) (percentage): | | | | | | | | | | | |
| 60 mesh | 99.3 | 60.5 | 59.1 | 60.6 | 71.5 | 100 | 100 | 100 | 100 | 100 | 100 |
| 80 mesh | 58.6 | 31.1 | 30.0 | 20.1 | 32.4 | 99.5 | 99.6 | 99.8 | 99.6 | 99.7 | 99.8 |
| 100 mesh | 32.1 | 19.5 | 18.5 | 11.5 | 15.6 | 80.5 | 81.4 | 85.4 | 83.6 | 85.0 | 90.0 |
| 150 mesh | 7.8 | 5.6 | 5.0 | 2.5 | 3.1 | 31.5 | 33.3 | 35.2 | 38.1 | 39.0 | 40.0 |
| 200 mesh | 3.1 | 1.0 | 0.8 | 0.1 | 0.2 | 3.1 | 3.5 | 4.2 | 3.8 | 3.0 | 2.1 |
| Plasticizer take-up (g.) | 23 | 26 | 26 | 28 | 27 | 40 | 42 | 42 | 43 | 41 | 40 |
| Dry-up time of plasticizer (min.) | 18.6 | 15.2 | 15.3 | 14.5 | 14.1 | 10.2 | 10.0 | 9.9 | 9.8 | 10.1 | 11.0 |
| Gelation time of (min.) | 2.3 | 2.3 | 2.2 | 2.0 | 1.9 | 1.2 | 1.1 | 1.2 | 0.9 | 1.2 | 1.0 |
| Transparency | c | b | b | b | b | a | a | a | a | a | a |
| Solubility | 40 | 10 | 10 | 10 | 10 | 10 | 10 | 10 | 10 | 10 | 10 |

As apparent from Table 3, polymers (in Examples 5-10) obtained by simultaneously using a polyethylene oxide and a sorbitan higher fatty acid ester, were larger in the absorption velocity and retained amount of plasticizer, faster in gelation and superior in transparency and solubility, as compared with polymers (in Controls 4–9) obtained by using conventional, well-known suspension stabilizers.

Example 9

Vinyl chloride was polymerized by the use of suspension stabilizer A or suspension stabilizers B and C (the present invention), in the same procedure as in Example 1, but at a polymerization temperature varied within the range of 40°–70° C. and the relationship between the retained amount of plasticizer and mean polymerization degree of the resultant various polymers was observed. Thus, a result as shown in the accompanying drawing, was obtained.

As apparent from the drawing, the polymer (Curve I) obtained according to the method of the present invention was larger in the retained amount of plasticizer even though the mean polymerization degree was varied, as compared with the polymer (Curve II) obtained by using a conventional, well-known suspension stabilizer, and it has been confirmed that the method of the present invention can be effectively applied to a wide range of polymerization temperature.

What is claimed is:
1. In the well known method for producing polyvinylchloride by polymerizing vinyl chloride monomer in an aqueous dispersion medium utilizing a suspension stabilizer, an initiator, and conventional temperatures, pressures, and reaction times, the improvement which comprises utilizing as the suspension stabilizer, 0.01–2.0% by weight of a polyethylene oxide and 0.01–2.0% by weight of a nonionic surfactant based upon the weight of the monomer, the weight average molecular weight of said polyethylene oxide being within the range of

$$4 \times 10^4 - 1.2 \times 10^6.$$

2. An improvement according to Claim 1 wherein said nonionic surfactant is at least one material selected from the group consisting of sorbitan monolaurate, sorbitan monostearate, polyoxyethylene sorbitan monolaurate, polyoxyethylene sorbitan monostearate, glycerol monostearate and polyoxyethylene-polyoxypropylene copolymer.

References Cited
UNITED STATES PATENTS 3,340,243  9/1967  Beer et al. _____ 260—87.5
3,451,985  6/1969  Mahlo _____ 260—92.8 W

FOREIGN PATENTS 587,880  5/1947  Great Britain ____ 260—92.8 W

OTHER REFERENCES

Hopff, H. et al.: *Polyethylene Oxides As Protective Colloids*. In Makromol. Chem., 84, 282–8 (1965).

JOSEPH L. SCHOFER, Primary Examiner

J. KIGHT, Assistant Examiner